2,854,356

Patented Sept. 30, 1958

2,854,356

GLASS FIBERS COATED WITH AMINE FLUOSILICATES AND METHOD OF MAKING SAME

Laurence R. B. Hervey, West Concord, and Derek E. Till, Concord, Mass., assignors to Arthur D. Little, Inc., Cambridge, Mass., a corporation of Massachusetts No Drawing. Application August 28, 1956
Serial No. 606,555

10 Claims. (Cl. 117—126)

This invention relates to the treatment of glass fibers. In one specific aspect, it relates to a novel method for imparting abrasion resistance to glass fibers. In another aspect, it relates to the novel article of manufacture produced as a result of the treating process.

Glass fibers, unless sized immediately after their formation, disintegrate very rapidly because of the abrasive action of one fiber upon another. To prevent undue breakage of the glass fibers or strands it has been common practice to apply to the fiber a lubricating agent, commonly referred to as a forming size, which remains on the fiber during further processing until a subsequent or finishing size is applied. For example, it has been known to coat the fiber surfaces with selected hydrocarbons shortly after their formation. Such a coating apparently serves as a lubricant preventing abrasion between adjoining and contacting fibers during processing operations. If the fibers are properly lubricated there is an absence of seizure or interlocking action between adjacent fibers, thereby obviating considerable breakage of the fibers and diminution in their length. An accepted commercial size or lubricating agent comprises an emulsion of polyvinyl alcohol, olive oil and an amine acetate containing a long carbon chain.

In treating of large quantities of glass fibers with present commercial forming sizes relatively high costs are involved in the preparation of the size and the subsequent treatment of the glass fibers. We have discovered that nitrogenous fluosilicates can be applied either in aqueous or anhydrous solutions and in relatively small amounts to glass fibers to impart to the fibers an abrasion resistance which is vastly superior to present commercial forming sizes.

It is therefore an object of the present invention to provide uniformly lubricated glass fibers and strands which have superior abrasion resistance properties and an economically feasible method of treating glass fibers to produce fibers and strands having these characteristics.

It is well known that amines will react with aqueous fluosilicic acid to form an addition compound. The reaction for a typical primary amine (methylamine) is shown hereunder:

(I) $2CH_3NH_2 + H_2SiF_6 \rightarrow (CH_3NH_2)_2 \cdot H_2SiF_6$ or $(CH_3NH_3)SiF_6$ Other nitrogenous compounds that form fluosilicate salts include secondary, tertiary and polyamines, formamides, and substituted formamides, and quaternary ammonium compounds. The preparation of these nitrogenous fluosilicates are shown below in Equations II to VI:

(II) Secondary amine: $2R_2NH + H_2SiF_6 \rightarrow (R_2NH_2)_2SiF_6$
(III) Tertiary amine: $2R_3N + H_2SiF_6 \rightarrow (R_3NH)_2SiF_6$
(IV) Polyamine: $NH_2RNH_2 + H_2SiF_6 \rightarrow NH_3RNH_3SiF_6$
(V) Amide: $2HCONR_2 + H_2SiF_6 \rightarrow (HCONHR_2)_2SiF_6$
(VI) Quaternary ammonium: $2R_4NOH + H_2SiF_6 \rightarrow (R_4N)_2SiF_6 + 2H_2O$ The nitrogenous fluosilicates are crystalline compounds, wax or resinous-like solids. Low molecular weight amine fluosilicates such as methyl, ethyl and propyl-amines are usually water-soluble and insoluble in organic solvents. For example, methylamine fluosilicate is 67.5% soluble in water and only 0.4% soluble in ethyl alcohol. Hydroxyl groups, such as contained in the isopropyl and glycol amines, increase water solubility. Branching or inclusion of side chains, such as in the di-2-ethylhexylamine fluosilicate, increases hydrocarbon solubility. This latter compound is highly soluble in all organic solvents. The medium molecular weight compounds (e. g. those containing 6 to 9 carbon atoms) are usually water-insoluble and hydrocarbon soluble. The high molecular weight compounds are water-insoluble and only slightly soluble in hydrocarbons.

The nitrogenous fluosilicates usually do not undergo hydrolysis and most of them are stable at high temperatures up to about 200° C. On heating at elevated temperatures they decompose into the free base, hydrogen fluoride and silicon tetrafluoride. The fluorine in these compounds ranges from 10 to 55% depending on the chain length of the amine or amine derivative selected for the reaction.

In accordance with the present invention we have discovered that organic nitrogeneous fluosilicates (hereinafter described by referring to the amine fluosilicates) can be conveniently applied to freshly made glass fibers to serve as a lubricant between adjoining and contacting fibers during processing operations. Two attributes of these compounds serve to make them effective for this purpose. First, the fluoride ion of amine fluosilicates causes adherence to the glass fiber. Because of this property there is little danger that the lubricant would be removed from individual fibers during subsequent processing operations and a uniform distribution of the lubricant is assured. Second, the organic portion of the molecule is especially effective for lubrication purposes. After the amine fluosilicate is applied to the glass fiber the contact between adjoining fibers is limited to an interplay between the adjoining organic films thus obviating the abrasive contact of one glass surface upon another.

In treating glass fibers we have found it convenient to prepare solutions of amine fluosilicates ranging from 0.1% to 10% by weight. Such a treating solution, or size, is contacted with the glass fiber until virtually the same percentage of amine fluosilicate is deposited on the surface of the fiber as is contained in the treating solution. This film drys at ambient temperatures on the fiber surface.

Below 0.1% the lubricating effect of the amine fluosilicate is greatly diminished. We have found that when more than 10% by weight of amine fluosilicate deposits on the surface of the fibers a sticky quality is imparted to the combined strand of fibers which is undesirable during subsequent processing operations. In addition, from an economic standpoint, it is obviously more desirable to use the smallest amount of amine fluosilicate which will produce the superior uniform lubricating and anti-abrasion properties.

In the commercial production of glass fibers the glass is melted in a high temperature furnace or oven containing a foraminous lower portion. The molten glass is discharged from the oven through tiny apertures to produce fine individual filaments of glass fibers. The individual filaments are cooled by water spray and it is common practice to pass these filaments over an inclined woolen pad adjusted at approximately 10° from the vertical position. The forming size may be applied to the filaments or fibers at this point. We have found that our amine fluosilicates may be dissolved and applied to the fibers as they cross the woolen pad. The forming size may also be applied by spraying directly on the fibers almost immediately after being formed. The weight-velocity of the glass filaments determines the flow rate or spraying rate required to produce a glass fiber having a 0.1% to 2% by weight film on the surface of the fiber. The fibers are air dried as they are directed toward a wheel or spindle at which point they are combined into a common strand for further processing. The application of the amine fluosilicate to the individual filaments before they coalesce into a common strand insures a minimum of mutual abrasion. The strand becomes a highly integral bundle wherein all the filaments coact to resist stresses, rather than being loaded unequally. As a result, the tensile strength of the strand is greatly increased.

In order to test the effectiveness of our novel amine fluosilicate size, we took strands of fiber weighing approximately 0.007 gram of 1.5 inches in length and cemented wires to both ends of each sample. One wire was connected to an oscillating machine and a weight was attached to the other. Ten twists were imparted to each of the strands. The strands were then oscillated over a stainless steel pin for abrasion testing. The number of cycles or oscillations was recorded for each strand or bundle of glass fibers which was tested. Tests were made using a variety of strands treated with our novel sizes, a standard commercial size "A" for comparison purposes and blank, untreated strands for the purposes of control. When using a 100 gram tension weight we found that untreated strands or bundles of glass fibers failed at 1481 and 979 cycles respectively. Under the same conditions a third sample previously treated with 2% solution of di-2-ethylhexylamine in ethyl alcohol was abraded for 47,798, cycles without breaking. Oscillation tests are further described in the examples which appear hereafter.

We have previously pointed out that our novel sizes may be applied in either aqueous or anhydrous solution. Because of the wide variation of solubility characteristics of the amine fluosilicates the optimum choice of a solvent will depend upon the solubility of a particular compound in that solvent. In general relatively low molecular weight amine fluosilicates are water-soluble. The medium and high weight compounds and the branch chain compounds are generally more readily adaptable for use in anhydrous medium. We have noted that certain amine fluosilicates can be emulsified in water by adding a small amount of one of the usual additives or emulsifiers found in commercial sizes, especially polyvinyl alcohol. This latter compound increases the tendency of the lower molecular weight amine fluosilicates to adhere to glass. While its presence is useful to a certain extent, it is by no means necessary for the preparation of our novel treating solutions. The use of an unreactive organic solvent in the preparation of our sizes may be limited for particular applications because of the flammable nature of the solvent. The term "unreactive" as applied to the solvents is intended to embrace those solvents that do not react with the amine fluosilicate selected for the preparation of the treating solution. Various solvents such as chloroform, ethanol, butanol, carbon tetrachloride, and many others have been found to be suitable in the preparation of our treating solutions. Alcohol-water mixtures are also adequate for this purpose, especially butanol-water mixtures.

We have found that prepared fluosilicates of methylamine, morpholine, di-n-butylamine, rosinamine, aniline, di-2-ethylhexylamine, dimethylamine, trimethylamine, ethylamine, diethylamine, triethylamine, propylamine, dipropylamine, isopropylamine, di-isopropylamine, butylamine, tributylamine, amylamine, diamylamine, triamylamine, hexylamine, cyclohexylamine, heptylamine, dinoncyclohexylamine, 2-ethylhexylamine, nonylamine, dinonylamine, octylamine, dioctylamine, n-nonyl-t-octylamine, decylamine, dodecylamine, tetradecylamine, octadecylamine, tallow amine, ditallow amine, soya amine, cocoamine, dicocoamine, stearylamine, ethanolamine, diethanolamine, triethanolamine, methylethanolamine, ethylethanolamine, butylethanolamine, phenylethanolamine, diethylaminoethanol, dimethylaminoethanol, o-tolyl-ethanolamine, diethylethanolamine, isopropanolamine, di-isopropanolamine, tri-isopropanolamine, dimethylisopropanolamine, 2-amino-1-butanol, ethylenediamine, propylenediamine, aminopropyl tallowamine, aminopropyl soya-amine, aminopropylcocoamine, ethylmorpholine, n-aminopropylmorpholine, n-aminoethylmorpholine, pyridine, acetylethanolamine, o-toluidine, α-naphthylamine, guanidine, phenylguanidine, guanylurea, acetylenediurein, furfurylamine, dimethylformamide, 2-amino-2-methyl-1,3 propanediol, 2-amino-2-methyl-1-propanol, 2-amino-2-ethyl-1,3-propanediol, tris(hydroxymethyl)aminoethane, tris(hydroxyethyl)aminoethane, 1-hydroxyethyl-2-ane, 2-ethylhexyl-3-aminopropyl-heptadecenyl glyoxalidine, 2-ethylhexyl-3-aminopropyl-ether, tetraethanolammonium-hydroxide, morpholine ethether, 1-alkyl-2-heptadecenyl-2-imidazoline, 1-alkyl-2-heptanol, 1-alkyl-2-imidazoline, benzaldimethylamine, phenylbitadecyl-2-imidazoline, dicyandiamide, 2-amino-1-butanol, hexamethylguanide, N-nonyl-alkylamine, hexamethylene tetraenediamine, and hydrogenated tallow amine are useful for the mine, purposes of the present invention. Of the low molecular weight compounds those containing at least one chain of at least 4 carbon atoms appear to be most effective.

Our invention is further illustrated by the following examples:

EXAMPLE I

Treated strands of newly formed glass fibers weighing about 0.007 g. were cut to 1½ inches in length. The ends of each of the strands were cemented to wires. One wire was connected to an oscillating machine and the other to a tension weight weighing 100 g. The strands were twisted ten times and were oscillated over a stainless steel pin for the purposes of abrasion testing. The strands contacted the pin over an arc of approximately 90°. The results are summarized in Table I shown hereunder. Glass fibers tested were treated with solutions containing 1 and 2% by weight of various amine fluosilicates and subsequently oven dried at a temperature of about 105° C. For control purposes tests were made with untreated strands of glass fibers. Several strands of glass fibers were tested after treatment with each size shown in the table, and the mean number of cycles at which failure occurred was recorded.

Table I

LUBRICATING EFFECT OF VARIOUS FLUOSILICATES ON GLASS FIBERS

| Fluosilicate | Percent in Solution | Mean No. of Cycles |
|---|---|---|
| Di-2-ethylhexylamine | 2 | 17,250 (including one of 47,798). |
| Dibutylamine | 2 | 6,357. |
| Rosinamine | 1 | 19,863. |
| Morpholine | 2 | 1,200. |
| Control: Untreated | | 400 (including one of 1,481). |

EXAMPLE II

The procedure of Example I was repeated using solutions of 10% strength to apply the lubricating film to the glass fibers. Since the amine fluosilicate is rapidly deposited on the surface of the fiber, by regulating the contact time of the size and fiber the weight ratio of lubricating film to dry fiber after treatment is controlled to approximately 10%. For these experiments a 200 g. tension weight was substituted for the 100 g. weight of Example I. Table II hereunder shows the particular compound selected for the preparation of the treating solution, the solvent used, and the mean number of cycles required to break the strands of glass fibers. For the purposes of control glass fibers treated with paraffin wax, octadecylamine acetate, size A, and tallowamine, untreated strands were tested. Since A is a standard commercial size containing PVA 5 parts, olive oil 5 parts, and C-18 amine 5 parts, all emulsified in 88 parts of water. All tests were run on untreated samples at the beginning and end of the series. In this way any change in the nature of the glass with time would have been revealed.

*Table II*

LUBRICATING EFFECT OF VARIOUS FLUOSILICATES ON GLASS FIBERS

| Fluosilicates | Solvent | Mean No. of Cycles to Break |
|---|---|---|
| Tallow amine | CCl₄ | 3,387 |
| Dodecylamine | Butanol-Water | 1,718 |
| Dicocoamine | CCl₄ | 734 |
| Aminopropyl tallowamine | Butanol-Water | 611 |
| Rosinamine | do | 535 |
| Di-2-ethylhexylamine | Ethanol | 470 |
| Dicyclohexylamine | Water | 379 |
| Phenylethanolamine | do | 305 |
| Cyclohexylamine | do | 247 |
| Hexylamine | Butanol-Water | 243 |
| Phenylguanidine | Water | 184 |
| Diethylene triamine | do | 180 |
| Octylamine | Butanol-Water | 178 |
| Guanidine | Water | 114 |
| Butylamine | do | 85 |
| Dibutylamine | do | 68 |
| Triethylamine | do | 67 |
| Ethylene diamine | do | 39 |
| Propylenediamine | do | 28 |
| Dimethylamine | do | 28 |
| Controls: | | |
| Paraffin Wax | CCl₄ | 175 |
| Octadecylamine Acetate | Water | 116 |
| Size "A" | do | 237 |
| Tallow Amine | CCl₄ | 314 |
| Blank at start | | 49 |
| Blank at end | | 54 |

EXAMPLE III

The procedure of Example I was repeated using a 200 g. tension weight and 10% solutions of fatty acid amine fluosilicates as sizes. It should be pointed out that the results of this example summarized hereunder in Table III differ from those shown in Example II, Table II because of the inherent differences using a new fresh batch of glass fibers.

*Table III*

LUBRICATING EFFECT OF FATTY ACID AMINE FLUOSILICATES

| Fluosilicate | Solvent | Mean No. of Cycles to Break |
|---|---|---|
| Tallowamine | CCl₄ | 6,474 (including one of 15,209). |
| Octadecylamine | Butanol-H₂O | 8,846. |
| Soyamine | Butanol-H₂O | 4,810. |
| Cocamine | Butanol-H₂O | 1,960. |
| Hydrogenated Tallowamine | CCl₄ | 3,611. |
| Tetradecylamine | CCl₄ | 2,503. |
| Hexadecylamine | CCl₄ | 1,129. |
| Control: Blank | | 139. |

EXAMPLE IV

The procedure of Example I was repeated using a 200 g. tension weight and samples prepared using 10% treating solutions of various amine salts to compare the relative effectiveness of the amine fluosilicates. For purposes of comparison the amine hydrochlorides, nitrates, sulfates, phosphates and acetates were tested and compared with the fluosilicates using samples from the same portion of fresh glass fibers. An untreated sample was also tested for control purposes. In Table IV shown hereunder the particular salt of the base is indicated, showing the mean number of cycles causing failure of the glass fiber to occur.

*Table IV*

COMPARISON OF VARIOUS AMINE SALTS

| Amine Base | Mean No. of Cycles to Break | | | | | |
|---|---|---|---|---|---|---|
| | Hydrochloride | Nitrate | Sulfate | Phosphate | Acetate | Fluosilicate |
| Tallow amine | 387 | 249 | 283 | 242 | 88 | 6,474 |
| Octadecylamine | 497 | | 1,008 | 247 | | 8,846 |
| Soyamine | 209 | | | | | 4,810 |
| Cocamine | 635 | | | | | 1,960 |
| Hydrogenated tallow amine | 919 | 774 | | | | 3,611 |
| Control: Blank | 139 | | | | | |

The foregoing tests demonstrate that we have discovered an effective competitive method of treating glass fibers to lubricate adjoining fibers and eliminate breakage caused by abrasive contacts between them. Since the amine fluosilicates are relatively inexpensive to prepare on a commercial scale, we have provided a low cost superior size for the treatment of glass fibers during commercial processing.

We claim:

1. A process of treating glass fibers comprising applying to said fibers a solution of an amine fluosilicate containing a carbon chain having at least 4 carbon atoms and thereafter drying the coated fibers to produce a residual lubricating film thereon, thereby increasing the abrasion resistance of said fibers.

2. A process of treating glass fibers comprising applying to said fibers an amine fluosilicate containing a carbon chain having at least 4 carbon atoms dissolved in an aqueous solution, and anhydrous solutions, and thereafter drying said fibers to produce a residual lubricating film thereon, thereby increasing the abrasion resistance of said fibers.

3. A process of treating glass fibers comprising applying to said fibers a solution of an amine fluosilicate containing a carbon chain having at least 4 carbon atoms, said solution containing from about 0.1% to 10% of said amine fluosilicate by weight, and thereafter drying said fibers to produce a residual lubricating film thereon, thereby increasing the abrasion resistance of said fibers.

4. A process of treating glass fibers comprising applying to said fibers a solution of an amine fluosilicate selected from the group consisting of the fluosilicates of tallow amine, octadecylamine, soyamine, cocamine, hydrogenated tallow amine, tetradecylamine, and hexadecylamine, and thereafter drying said fibers to produce a residual lubricating film thereon, thereby increasing the abrasion resistance of said fibers.

5. A process of treating glass fibers comprising applying to said fibers an aqueous solution of tallow amine fluosilicate containing from 0.1% to 10% by weight of said fluosilicate, and thereafter drying said fibers to produce a residual lubricating film thereon, thereby increasing the abrasion resistance of said fibers.

6. As a new article of manufacture, a glass fiber coated with a film of an amine fluosilicate containing a carbon chain having at least 4 carbon atoms; the fluoride portion thereof causing adherence of said film to said fiber and the organic portion thereof causing lubrication of the surface of said fiber, thereby increasing the abrasion resistance of said fiber during movement in juxtaposition of said fiber with contacting surfaces.

7. As a new article of manufacture, a glass fiber coated with a film of an organic amine fluosilicate selected from the group consisting of the fluosilicates of tallow amine, octadecylamine, soyamine, cocoamine, hydrogenated tallow amine, tetradecylamine, and hexadecylamine; the fluoride portion thereof causing adherence of said film to said fiber and the organic amine portion thereof causing lubrication of the surface of said fiber, thereby increasing the abrasion resistance of said fiber during movement in juxtaposition of said fiber with contacting surfaces.

8. As a new article of manufacture, a glass fiber coated with a film of an amine fluosilicate, containing a carbon chain having at least 4 carbon atoms in an amount ranging from 0.1% to 10% by weight of said amine fluosilicate to the weight of said dry fiber.

9. As a new article of manufacture, a glass fiber coated with a film of tallow amine fluosilicate in an amount ranging from 0.1% to 10% by weight of said amine fluosilicate to the weight of said dry fiber, thereby increasing the abrasion resistance of said fiber with respect to contacting surfaces.

10. A process of treating glass fibers comprising applying to said fibers an amine fluosilicate containing a carbon chain having at least 4 carbon atoms dissolved in an organic solvent, and thereafter drying said fibers to produce a residual lubricating film thereon, thereby increasing the abrasion resistance of said fibers.

References Cited in the file of this patent

UNITED STATES PATENTS

| | | |
|---|---|---|
| 1,917,463 | Salzberg et al. | July 11, 1933 |
| 2,150,601 | Flint | Mar. 19, 1939 |
| 2,200,603 | Hentrich | May 14, 1940 |
| 2,415,017 | MacKenzie | Jan. 28, 1947 |
| 2,446,119 | White et al. | July 27, 1948 |
| 2,553,314 | Haber | May 15, 1951 |
| 2,759,958 | Fitch | Aug. 21, 1956 |

FOREIGN PATENTS

| | | |
|---|---|---|
| 555,481 | Great Britain | Aug. 25, 1943 |